W. T. ODER.
AUTOMOBILE TOP.
APPLICATION FILED APR. 15, 1911.
1,045,428. Patented Nov. 26, 1912.
3 SHEETS—SHEET 1.
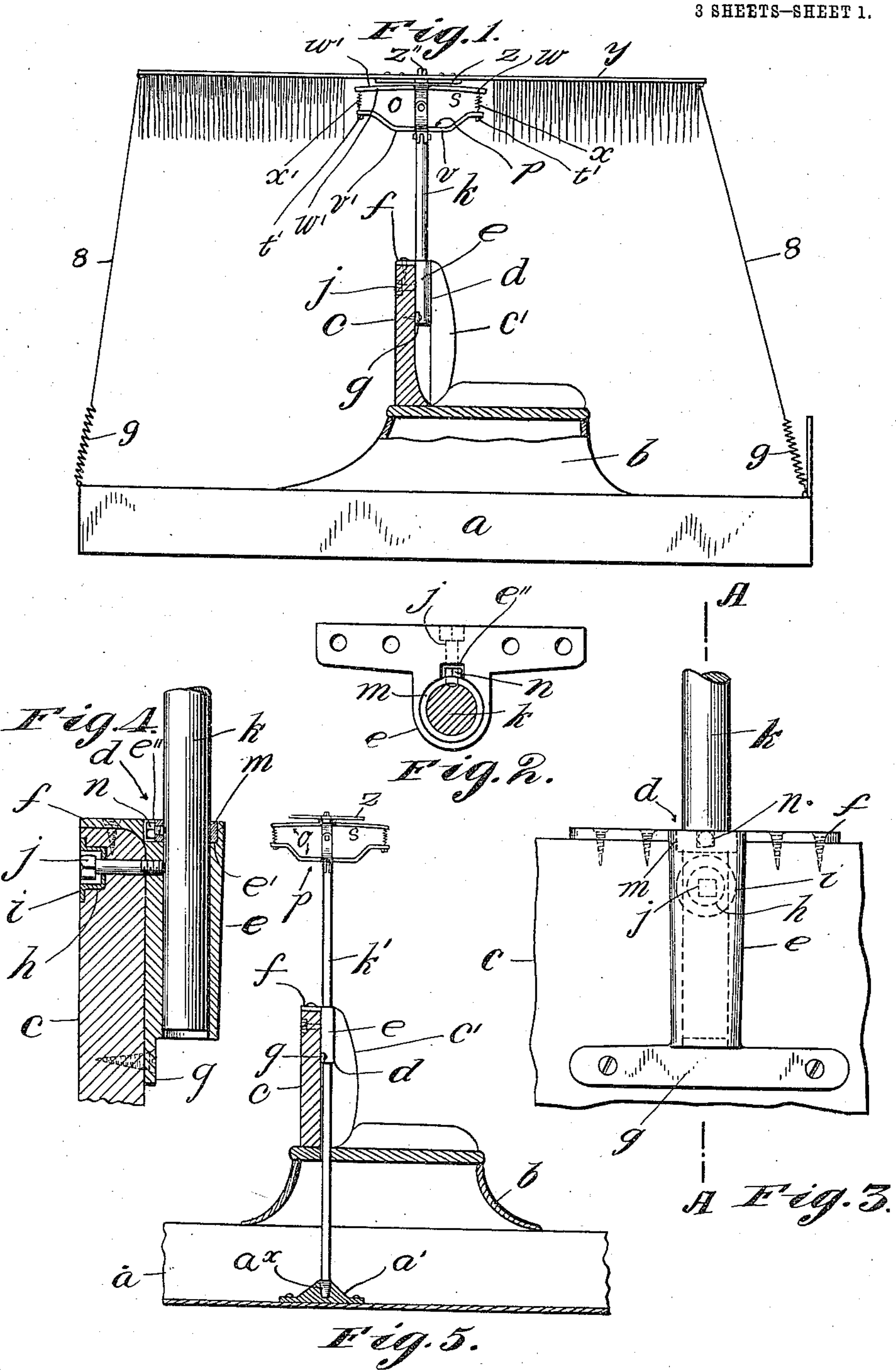
Witnesses:
M. Reimer.
M. Hamilton.
William T. Oder Inventor
By his Attorney
James Hamilton
COLUMBIA PLANOGRAPH CO., WASHINGTON, D. C.

W. T. ODER.
AUTOMOBILE TOP.
APPLICATION FILED. APR. 15, 1911.
1,045,428. Patented Nov. 26, 1912.
3 SHEETS—SHEET 2.
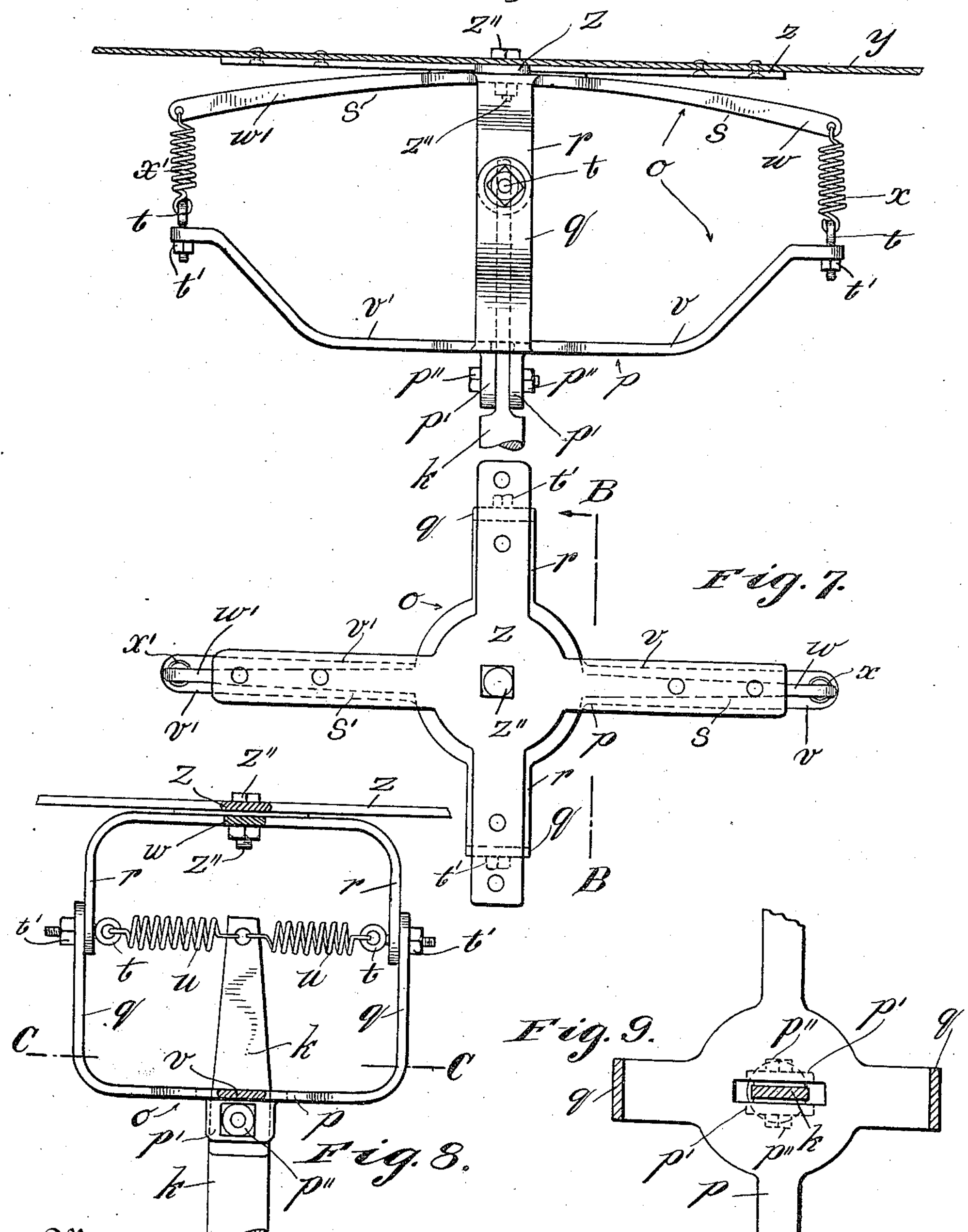
Witnesses:
M. Reimer.
M. Hamilton.
William T. Oder Inventor
By his Attorney
James Hamilton
COLUMBIA PLANOGRAPH CO., WASHINGTON, D. C.

W. T. ODER.
AUTOMOBILE TOP.
APPLICATION FILED APR. 15, 1911.
1,045,428.
Patented Nov. 26, 1912.
3 SHEETS—SHEET 3.
Fig. 10.
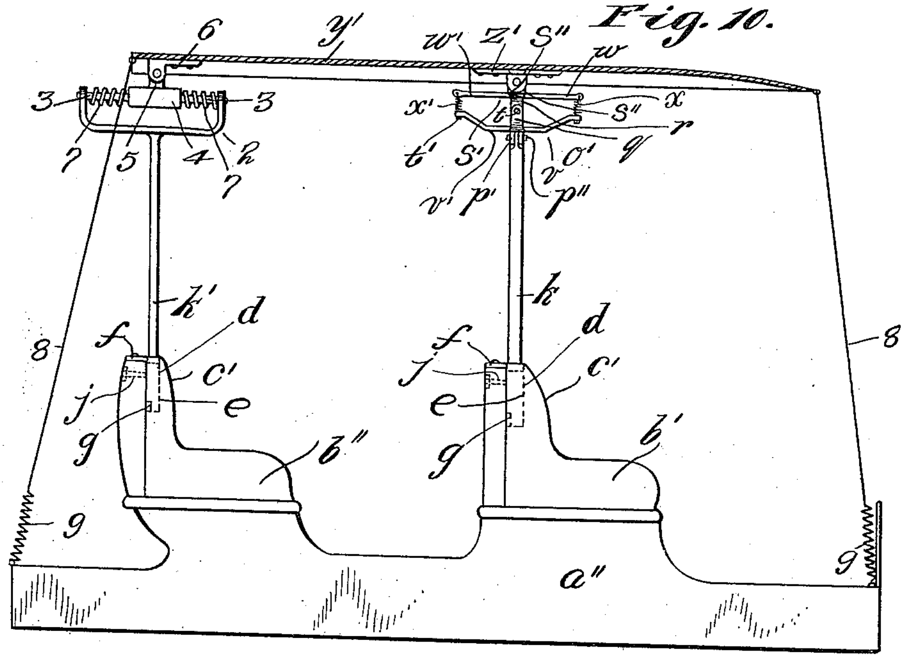
Fig. 11.
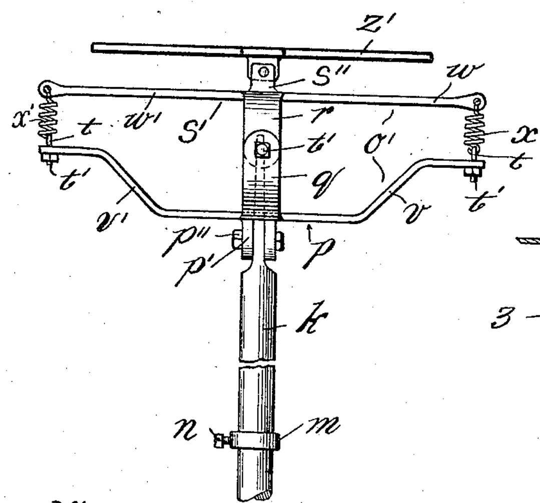
Fig. 12.
Fig. 13.
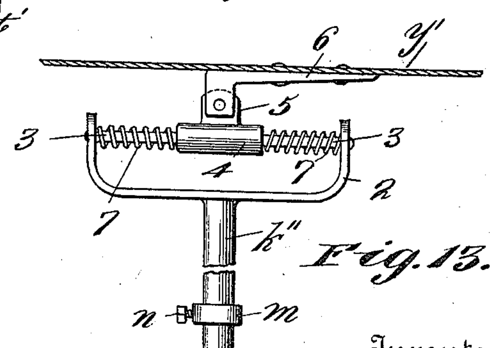
Witnesses:
M. Reimer.
M. Hamilton
Inventor
William T. Oder
By his Attorney
James Hamilton
COLUMBIA PLANOGRAPH CO., WASHINGTON, D. C.

UNITED STATES PATENT OFFICE.

WILLIAM T. ODER, OF ROSEDALE, CALIFORNIA.

AUTOMOBILE-TOP.

1,045,428. Specification of Letters Patent. Patented Nov. 26, 1912.

Application filed April 15, 1911. Serial No. 621,323.

*To all whom it may concern:*

Be it known that I, WILLIAM T. ODER, a citizen of the United States, residing at Rosedale, in the county of Kern and State of California, have invented certain new and useful Improvements in Automobile-Tops, of which the following is a specification, reference being had to the accompanying drawings.

This invention relates to improvements in automobile tops and particularly to improvements in supports or mountings for such tops; and an object of this invention is to provide a support for an automobile top which will be simple in construction, comparatively cheap in manufacture and most efficient and durable in use.

Another object of this invention is to provide a support for an automobile top which will be yielding in character and which will relieve the automobile from shocks and jars due to sudden stresses produced by obstructions and inequalities in the roadway and like causes.

A third object of this invention is to provide a support for an automobile top which will permit the same support to be used for light tops and for heavy tops.

A fourth object of this invention is the provision of a support for an automobile top which will be particularly well adapted for use with extra long tops.

A fifth object of this invention is the provision of a support for an automobile top which will be comparatively light, which may be easily handled, which will be susceptible of being readily put in place and removed therefrom and which will offer a minimum wind resistance.

Other features of my invention will be alluded to in the description which follows.

In the drawings illustrating the principle of this invention and the best mode now known to me of applying that principle, Figure 1 shows in side elevation an automobile body provided with an automobile top which embodies my invention; Fig. 2 is a detail which shows in plan the post-holder; Fig. 3 is a detail which shows the post-holder in front elevation; Fig. 4 is a section on the line A—A of Fig. 3; Fig. 5 shows a modified form of this invention in which the post extends to the bottom of the body; Fig. 6 is a detail showing in side elevation the spring-cushioned supporting frame mounted pivotally on the upper end of the post; Fig. 7 is a plan of what is shown in Fig. 6 with the top removed; Fig. 8 is a section on the line B—B of Fig. 7; Fig. 9 is a section on the line C—C of Fig. 8; Fig. 10 shows another form of this invention in which provision is made for supporting an extra long top; Fig. 11 is a detail showing in side elevation the spring mounting upon the upper end of the front post shown in Fig. 10; Fig. 12 is a plan of the spring-controlled frame illustrated in Fig. 11 with the top removed; and Fig. 13 is a detail illustrating in side elevation the yielding connection between the automobile top and the upper end of the rear post of the construction shown in Fig. 10.

In the body *a* of the vehicle there is mounted the usual seat *b* to the back *c* of which is fastened a post-holding bracket *d*. The latter consists of a tubular holder *e* formed integral with the crosspieces *f*, *g*, at its top and bottom, respectively. The upper crosspiece *f* is fastened to the top wall of the back *c* of the seat *b*, while the lower crosspiece *g* is fastened to the front face of the back *c*. In the rear face of the latter there is formed a recess *h* lined with a cup-like or dished plate *i*; and through the back *c* passes a screwbolt *j* the threaded end of which engages the tubular holder *e* and the head of which lies within the lining cup or shell *i*. Near its upper end the interior wall of the tubular holder *e* is formed with an annular ledge or shoulder *e′* and with a notch or recess *e″* above this ledge or shoulder *e′*. Near its lower end the post or staff *k* is fitted in the tubular holder *e* and is provided with a ring or collar *m* held on the post *k* by a set-screw *n*. The collar *m* rests upon the ledge or shoulder *e′*, while the head of the set-screw lies in the notch *m* and prevents the post *k* from turning.

Mounted free to swing from side to side upon the upper end of the post *k* is a spring-cushioned top-supporting frame *o* from the bottom or base member *p* of which project downwardly the centrally-disposed lugs *p′* between which is pivotally fastened by the pivot bolt *p″* the upper end of the staff or post *k*. Formed integral with the base member *p* is a pair of centrally-disposed L-shaped or bent arms *q* (Fig. 8) which together form a U-shaped bracket. In the upper ends of the upwardly-extending arms *q* are pivotally fastened the lower ends of the downwardly-extending L-shaped or bent legs *r* which project from the top frame-member *s* and together form another U-shaped centrally-disposed bracket. The eyebolts $t$ form the pivot bolts which connect the legs $r$ with the arms $q$; and between the eye end of each eyebolt $t$ and the upper end of the post $k$ is interposed a coil spring $u$ (Fig. 8). The base member $p$ of the frame $o$ is formed with a forwardly-extending arm $v$ and a rearwardly-extending arm $v'$; and the top member $s$ of the frame $o$ is likewise provided with a forwardly-extending arm $w$ and a rearwardly-extending arm $w'$. At their front ends $t$ there is interposed between the arms $v$, $w$ a coil spring $x$ and between the rear ends of the arms $v'$, $w'$ there is interposed a similar coil spring $x'$. By means of nuts $t'$ mounted on the eyebolts $t$ the tension of the springs, $u$, $x$ and $x'$ may be adjusted. The coil springs $u$ will cushion any swaying movement of the automobile top $y$ from side to side, while the coil springs $x$, $x'$ will cushion any up-and-down or see-saw vibratory movement of the automobile top at its front or rear end. To the automobile top $y$ is fastened in any suitable manner a cross-shaped plate $z$, which is also fastened by the bolt $z''$ to the top frame-member $s$ of the supporting frame $o$. By this arrangement of parts, it is made possible to secure to the supporting frame $o$ automobile tops of various sizes, changing one for another at will.

In Fig. 5 the post or staff $k'$ is shown extending down to the bottom or bed of the vehicle-body $a$ to which is secured a suitable socket member $a'$ in which is snugly fitted the polygonal-shaped foot or lower end $a^{\times}$ of the post $k'$. The latter is fastened to the back $c$ of the seat $b$ in the same manner as the post $k$ is held in the construction shown in Fig. 1.

In the construction shown in Figs. 10 to 13, inclusive, the automobile body $a''$ is formed with a front seat $b'$ and a rear seat $b''$. The posts $k$, $k''$ are fastened to the back of the seats $b'$, $b''$ in the same manner as the post $k$ is mounted in the construction illustrated in Figs. 1 to 4, inclusive. The base member $p$ of the supporting frame $o'$ is pivotally fastened to the upper end of the front post $k$ in the same manner as illustrated in the latter figures; but the top frame member $s'$ differs from the top frame member $s$ in that it is formed with a pair of centrally disposed ears or lugs $s''$ between which is pivotally fastened a downwardly-projecting lug formed on a cross-shaped coupling plate $z'$ suitably fastened to the automobile top $y'$. The upper end of the rear post $k''$ is bifurcated and the forked ends 2 are connected by a lengthwise-extending rod 3 on which is slidably mounted a sleeve 4 formed with a lug 5 to which is pivotally fastened one end of an L-shaped bracket 6 the other end of which is fastened to the automobile top $y'$. Between the forked ends 2 and the ends of the collar or sleeve 4 are mounted on the rod 3 coil springs 7 which cushion any vibratory or reciprocating movement of the rear of the top $y'$. Instead of the cross-shaped coupling-plate $z'$, an L-shaped bracket similar to the bracket 6 may be used to couple or fasten the top $y'$ to the top frame-member $s'$ in Fig. 10.

In the constructions shown in Figs. 1 and 10, the corners of the automobile tops $y$, $y'$ are connected with the corresponding corners of the automobile body by means of guy straps 8 between the lower ends of which and the automobile body are interposed coil springs 9.

It will be understood that the lower end portions of the posts $k$, $k'$, $k''$ are covered and hidden by the upholstery $c'$ of the seat in which the post is mounted. This gives the structure a finished and sightly appearance. It will be further understood that the post may be bent instead of straight, if the exigencies of the construction require it to be bent.

I claim:

1. A vehicle-top support having a top-supporting frame consisting of a base frame-member and a top frame member pivotally connected thereto; a staff upon the upper end of which is pivotally mounted said top-supporting frame; yielding devices interposed between the latter and the upper end of said staff; and yielding devices interposed between said frame-members.

2. A vehicle-top support having a staff; a base frame-member pivotally mounted upon the upper end of said staff; a top frame-member pivotally mounted upon said base frame-member; and yielding devices interposed between said members and the upper end of said staff.

3. A vehicle-top support having a staff the upper end of which is bifurcated; a rod mounted in the upper end of said staff; a slide mounted upon said rod; a top-supporting device carried by said slide; and yielding devices interposed between the ends of the latter and the forked ends of said staff.

4. A vehicle-top support having a pair of staffs; a top-supporting frame mounted upon the upper end of one of said staffs; a slide mounted upon the upper end of the other of said staffs free to move toward and from the first-named staff; and a top-supporting device pivotally connected with and carried by said slide.

5. A vehicle-top support having a pair of staffs; a top-supporting frame pivotally mounted in the upper end of one of said staffs; a slide mounted in the upper end of the other of said staffs free to move toward and from the first-named staff; and a top-supporting device connected with and carried by said slide.

6. A vehicle-top support having a pair of staffs; a top-supporting frame mounted upon the upper end of one of said staffs; a top-supporting device pivotally connected with said frame; a slide carried by the other said staffs free to move toward and from the first-named staff; and a top-supporting device carried by said slide.

7. A vehicle-top support having a pair of staffs; a top-supporting frame mounted in the upper end of one of said staffs; a top-supporting device pivotally connected with said frame; a slide mounted in the upper end of the other of said staffs free to move toward and from the first-named staff; and a top-supporting device pivotally connected with and carried by said slide.

8. A vehicle-top support having a pair of staffs; a top-supporting frame mounted in the upper end of one of said staffs and pivotally connected therewith; yielding devices mounted between the parts of said top-supporting frame; yielding devices mounted between the latter and the upper end of the staff to which the same is pivotally connected; a top-supporting device; and yielding devices interposed between said top-supporting device and the upper end of the other of said staffs.

9. A vehicle-top support having a pair of staffs; a top-supporting frame pivotally mounted upon the upper end of one of said staffs; yielding devices mounted between the last-named staff and said top-supporting frame; yielding devices mounted between the parts of the latter; a slide mounted on the upper end of the other of said staffs; a top-supporting device pivotally connected with said slide; and yielding devices mounted between said slide and the upper end of the staff on which the same is mounted.

10. A vehicle-top support having a pair of staffs; a top-supporting frame pivotally mounted in the upper end of one of said staffs; yielding devices interposed between said upper end and frame; yielding devices interposed between the parts of said frame; a device for coupling the latter to the vehicle top; a slide mounted in the upper end of the other of said staffs; yielding devices interposed between said slide and the upper end of the staff in which the same is mounted; and a top-supporting device pivotally connected with said slide.

11. A vehicle-top support having a pair of staffs; a top-supporting frame pivotally mounted upon the upper end of one of said staffs; yielding devices interposed between the said frame and the upper end of the staff in which the same is mounted; yielding devices interposed between the parts of said frame; a coupling device which is pivotally connected to said frame; and a top-supporting device which is pivotally and slidably connected with the upper end of the other of said staffs.

12. A vehicle-top support having a pair of staffs; a top-supporting frame pivotally mounted upon the upper end of one of said staffs; yielding devices interposed between the upper end of the last-named staff and said frame; yielding devices interposed between the parts of the latter; a coupling device pivotally connected with said frame; a top-supporting device slidably and pivotally connected with the upper end of the other of said staffs; and yielding device interposed between said top-supporting device and the upper end of the staff to which the same is connected.

Signed at Bakersfield, California, in the presence of the two undersigned witnesses this 7th day of April, A. D., 1911.

WILLIAM T. ODER.

Witnesses:
W. A. ODER,
MABEL CROLL.

Copies of this patent may be obtained for five cents each, by addressing the "Commissioner of Patents, Washington, D. C."